US010112632B2

(12) United States Patent
Barnes et al.

(10) Patent No.: US 10,112,632 B2
(45) Date of Patent: Oct. 30, 2018

(54) METHOD AND SYSTEM FOR RAIL VEHICLE COUPLING DETERMINATION

(71) Applicant: Trapeze Software ULC, Mississauga (CA)

(72) Inventors: Sharon Ann Irma Barnes, Scottsdale, AZ (US); Marty Charles Brooks, Scottsdale, AZ (US); Paul Ernsdorff, Spokane, WA (US)

(73) Assignee: Trapeze Software ULC, Mississauga (CA)

( * ) Notice: Subject to any disclaimer, the term of this patent is extended or adjusted under 35 U.S.C. 154(b) by 0 days.

(21) Appl. No.: 14/939,312

(22) Filed: Nov. 12, 2015

(65) Prior Publication Data
US 2017/0137043 A1    May 18, 2017

(51) Int. Cl.
*B61G 7/14*  (2006.01)
*B61G 5/04*  (2006.01)
*G06K 19/07* (2006.01)

(52) U.S. Cl.
CPC .......... *B61G 7/14* (2013.01); *G06K 19/0723* (2013.01)

(58) Field of Classification Search
CPC ...... B61F 1/12; B61F 1/15; B61F 1/22; B61F 5/122; B61F 5/302; B61F 5/30; B61F 5/05; B61F 5/42; B61G 7/14; B61G 1/10; B61G 5/02; B61G 5/10; B61G 7/12; B61G 9/04; B61G 9/06; B61G 5/08; B61G 7/10; B61G 5/06; B61G 3/04; B61L 27/0061; B61L 27/0066; B61L 27/0083; B61L 25/04; B61L 23/044; B61L 27/04; B61L 15/0072; B61L 27/0011; G06K 9/00791; G06K 9/00302; G06K 19/0723; G06K 9/325
USPC ........ 701/19, 20, 2, 50, 1, 70, 102; 280/647, 280/87.01
See application file for complete search history.

(56) References Cited

U.S. PATENT DOCUMENTS

| 4,520,662 | A | * | 6/1985 | Schmid | B61G 7/00 213/75 R |
|---|---|---|---|---|---|
| 4,892,204 | A | * | 1/1990 | Lumbis | B61G 5/06 213/1.3 |
| 5,735,491 | A | * | 4/1998 | Atkinson | B61L 29/246 246/124 |
| 6,206,215 | B1 | * | 3/2001 | Maa | B61G 7/00 213/124 |

(Continued)

FOREIGN PATENT DOCUMENTS

| GB | 2462511 A | 2/2010 |
|---|---|---|
| WO | WO2015/081278 A1 | 6/2015 |

*Primary Examiner* — Courtney D Heinle
*Assistant Examiner* — Luis A Martinez Borrero
(74) *Attorney, Agent, or Firm* — Elan IP Inc.

(57) ABSTRACT

A system and method for identifying at least two transport units in coupled relationship forming a consist including determining via the presence of an electrical signal whether one end of a coupling unit at an end of a first transport unit is coupled to a second end of said coupling unit at an end of a second transport unit; determining by computer executable instructions executed by a computer processor a transport unit in closest proximity to said first transport unit; upon a condition in which said one end of said coupling unit is determined to be coupled to a second end of said coupling unit, identifying by said computer processor said second transport unit as said transport unit in closest proximity to said first transport unit.

8 Claims, 4 Drawing Sheets

(56) References Cited

U.S. PATENT DOCUMENTS

| | | | | |
|---|---|---|---|---|
| 6,588,966 B2* | 7/2003 | Kane | ................... | B61D 29/00 |
| | | | | 213/75 R |
| 6,862,502 B2* | 3/2005 | Peltz | ................... | B61L 3/125 |
| | | | | 246/187 C |
| 7,164,911 B2* | 1/2007 | Watanabe | ............ | H04W 60/00 |
| | | | | 455/435.1 |
| 7,177,732 B2* | 2/2007 | Kraeling | ............ | B61L 15/0081 |
| | | | | 303/22.6 |
| 7,388,483 B2* | 6/2008 | Welles | ................... | B61L 5/02 |
| | | | | 200/61.45 M |
| 7,805,227 B2* | 9/2010 | Welles | ................... | B61L 17/00 |
| | | | | 246/108 |
| 7,845,504 B2* | 12/2010 | Davenport | ............ | B61G 7/14 |
| | | | | 213/1.3 |
| 8,185,264 B2* | 5/2012 | Carroll | ............... | B61L 15/0027 |
| | | | | 246/167 D |
| 8,914,170 B2* | 12/2014 | Kraeling | ............... | H04L 45/74 |
| | | | | 701/19 |
| 9,073,561 B2* | 7/2015 | Egerton | ................. | B61G 7/14 |
| 9,096,241 B2* | 8/2015 | Kontetzki | ............... | B61G 7/10 |
| 9,114,816 B2* | 8/2015 | Smith | ................. | B61C 17/12 |
| 9,134,411 B2* | 9/2015 | Soderi | ................. | B61L 3/008 |
| 9,260,121 B2* | 2/2016 | Jung | ...................... | B61L 1/18 |
| 2003/0182030 A1* | 9/2003 | Kraeling | ............ | B61L 15/0081 |
| | | | | 701/19 |
| 2003/0183697 A1* | 10/2003 | Porter | ................... | B61L 3/125 |
| | | | | 235/492 |
| 2006/0047379 A1* | 3/2006 | Schullian | ............ | B61L 27/0077 |
| | | | | 701/19 |
| 2007/0014615 A1 | 6/2007 | Mamoru | | |
| 2007/0145196 A1* | 6/2007 | Davenport | ............... | B61G 7/14 |
| | | | | 246/1 C |
| 2007/0146159 A1* | 6/2007 | Kato | ................... | B61L 25/025 |
| | | | | 340/8.1 |
| 2007/0150130 A1* | 6/2007 | Welles | ................... | B61L 17/00 |
| | | | | 701/19 |
| 2009/0143928 A1* | 6/2009 | Ghaly | ................... | B61L 19/06 |
| | | | | 701/19 |
| 2010/0256842 A1* | 10/2010 | Liberatore | ............ | B60T 13/665 |
| | | | | 701/19 |
| 2011/0046826 A1* | 2/2011 | Carroll | ............... | B61L 15/0027 |
| | | | | 701/19 |
| 2012/0136514 A1* | 5/2012 | Noffsinger | .......... | B61L 15/0027 |
| | | | | 701/19 |
| 2014/0005863 A1 | 1/2014 | Linares | | |
| 2014/0129061 A1* | 5/2014 | Cooper | ............... | B61L 15/0036 |
| | | | | 701/19 |
| 2015/0217790 A1* | 8/2015 | Golden | ............... | B61L 15/0072 |
| | | | | 701/19 |
| 2015/0232079 A1* | 8/2015 | Martin | ................. | B60T 17/228 |
| | | | | 701/19 |
| 2016/0272228 A1* | 9/2016 | LeFebvre | ............ | B61L 15/0027 |
| 2017/0021847 A1* | 1/2017 | LeFebvre | ............ | B61L 15/0027 |
| 2017/0137043 A1* | 5/2017 | Barnes | ................... | B61G 7/14 |

\* cited by examiner

METHOD AND SYSTEM FOR RAIL VEHICLE COUPLING DETERMINATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The invention relates generally to methods and systems for determining the coupling status of transport units, and in particular to methods and systems for determining and identifying rail cars coupled together to form a consist.

BACKGROUND OF THE INVENTION

Trains traveling on railroads often move into and out of different jurisdictions or railways owned and operated by different entities on a regular basis. The ability to fully monitor the status of trains on different railways and in rail yards operated by different entities is limited. Often times, these trains also enter rail yards to undergo various services, either as part of normal train operations, as part of maintenance or inspections. When a train enters a rail yard, one or more railcars may be removed from the train and other railcars added, depending on the train route and the ultimate destination of the railcars. Therefore, the particular composition of a train will change as it enters and leaves each rail yard. Because individual railcars in a train may have different points of departure and different destinations, it is critical that each railcar in a train be identified and tracked. In addition, information related to individual railcars in a train needs to be communicated to the owner or operator of the train itself. Finally, it is essential to be able to identify a group of train cars which are coupled together as this changes as trains enter and subsequently depart a rail yard. A group of train cars which are coupled together and operate as a unit are referred to in the art as a Consist.

In the prior art, information relating to which cars form part of a Consist has been communicated manually to various entities, either by scanning an identifier on each railcar or by manual data entry, for example. However, each of these procedures have their flaws as they are heavily dependent on a human operator. There has heretofore been no way known to the applicant for an original operator or owner of a train to ensure knowledge of which train cars form a Consist once the train has been modified at a yard operated by another operator. Rather, once the train has returned to a yard or inspection station operated by the original operator, then the cars which form the Consist are logged. Alternatively, this information must be requested from the yard having performed the modifications to the Consist, and this information may not always be reliable or timely.

More recently, railcars have been equipped with radio frequency identification (RFID) tags. RFID tags can be either passive or active in nature. Passive tags need to pass within close proximity of a receiver before sending a signal identifying the car. Such receivers are often placed at the entrance or exit to a train yard. Active tags are used in trains equipped with real time locating systems (RTLS), within a predefined geographic area such that the trains can be located or identified at positions other than at the entrance or exit of the yard. While the provision of an RTLS system aboard a train serves to identify where a train is, there is no way to know whether cars in close proximity are actually coupled together, or which cars in a particular geographic area form a Consist. RTLS technology is not accurate enough to pinpoint the exact location of a train car, and even if it were, this would not be sufficient to confirm whether two cars close to each other were coupled together in a Consist. Accordingly, there is a need in the art for a method and system capable of accurately identifying where two or more cars are so coupled together to form a Consist.

SUMMARY OF THE INVENTION

In one embodiment of the invention, there is a system for identifying transport units in coupled relationship including a first transport unit having one end of a coupling unit at a front end thereof; the one end of the coupling unit including a mechanical coupling portion and an electrical coupling portion; a second transport unit have a second end of the coupling unit at a rear end thereof; the second end of the coupling unit including a complimentary mechanical coupling portion and a complimentary electrical coupling portion; the electrical coupling portion of first transport unit including a dry contact having a closed state when the mechanical coupling portion and the complimentary mechanical coupling portion are coupled together and an open state when the mechanical coupling portion and the complimentary mechanical coupling portion are uncoupled from each other; a communications device on the first transport unit in signal communication with the dry contact; the communications device configured to communicate a data packet identifying the first transport and a state of the dry contact to a communications receiving device; the communications receiving device including a computer processor and computer executable instructions for determining a transport unit in closest proximity to the first transport unit and for providing an indication that the first transport unit is coupled to the second transport unit upon a condition in which the dry contact is in the closed state.

In one aspect of this first embodiment, the system further includes a second dry contact having a closed state when the mechanical coupling portion and the complimentary mechanical coupling portion are coupled together and an open state when the mechanical coupling portion and the complimentary mechanical coupling portion are uncoupled from each other; and a second communications device in signal communication with the second dry contact; the second communications device configured to communicate a data packet identifying the second transport and a state of the second dry contact to the communications receiving device.

In another aspect of this first embodiment, the communications receiving device including computer executable instructions for determining a transport unit in closest proximity to the second transport unit and for providing an indication that the second transport unit is coupled to the first unit upon a condition in which the dry contact is in the closed state.

In another aspect of this first embodiment, the communications receiving device validates that the first transport unit is coupled to the second transport unit by comparing the data packet identifying the first transport unit and the data packet identifying the second transport unit.

In another aspect of this first embodiment, the first and second transport units are rail cars.

In another aspect of this first embodiment, the communications device comprises an RFID tag.

In another aspect of this first embodiment, the communications receiving device comprises a server receiving data directly or indirectly from the communications device.

In another aspect of this first embodiment, the RFID tag is coupled to the transport unit via a power filter module.

In a second embodiment of the invention, there is disclosed a method for identifying at least two transport units in coupled relationship including determining via the presence of an electrical signal whether one end of a coupling unit at an end of a first transport unit is coupled to a second end of the coupling unit at an end of a second transport unit; determining by computer executable instructions executed by a computer processor a transport unit in closest proximity to the first transport unit; upon a condition in which the one end of the coupling unit is determined to be coupled to a second end of the coupling unit, identifying by the computer processor the second transport unit as the transport unit in closest proximity to the first transport unit.

In one aspect of this second embodiment, the step of determining via the presence of an electrical signal further comprises determining via a communications device on the first transport unit in signal communication with a dry contact have a closed state when the one end of the coupling unit is coupled to the second end of the coupling unit and an open state when the one end of the coupling unit is uncoupled from the second end of the coupling unit.

In another aspect of this second embodiment, the determining by a computer executable instructions executed by a computer processor comprises determining by a communications receiving device including the computer processor and the computer executable instructions for determining a transport unit in closest proximity to the first transport unit and for providing an indication that the first transport unit is coupled to the second transport unit upon a condition in which the dry contact is in the closed state.

In another aspect of this second embodiment, the method is repeated with respect to the second transport unit and validating the identification of the two transport units by confirming that the first and second transport units are both coupled and are closest to each other.

In another aspect of this second embodiment, the first and second transport units are rail cars.

In another aspect of this second embodiment, wherein the communications device comprises an RFID tag.

In another aspect of this second embodiment, wherein the communications receiving device comprises a server receiving data directly or indirectly from the communications device.

In a third embodiment of the invention, there is disclosed a computer system including a computer processor and computer executable instructions stored on a computer readable medium which when executed by the computer processor: determines whether one end of a coupling unit at an end of a first transport unit is coupled to a second end of the coupling unit at an end of a second transport unit; determines a transport unit in closest proximity to the first transport unit; and upon a condition in which the one end of the coupling unit is determined to be coupled to a second end of the coupling unit, identifies the second transport unit as the transport unit in closest proximity to the first transport unit.

In one aspect of the third embodiment, the computer processor repeats the computer executable instructions with respect to said second transport unit to validate the identification of the two transport units by confirming that said first and second transport units are both coupled and are closest to each other.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1:
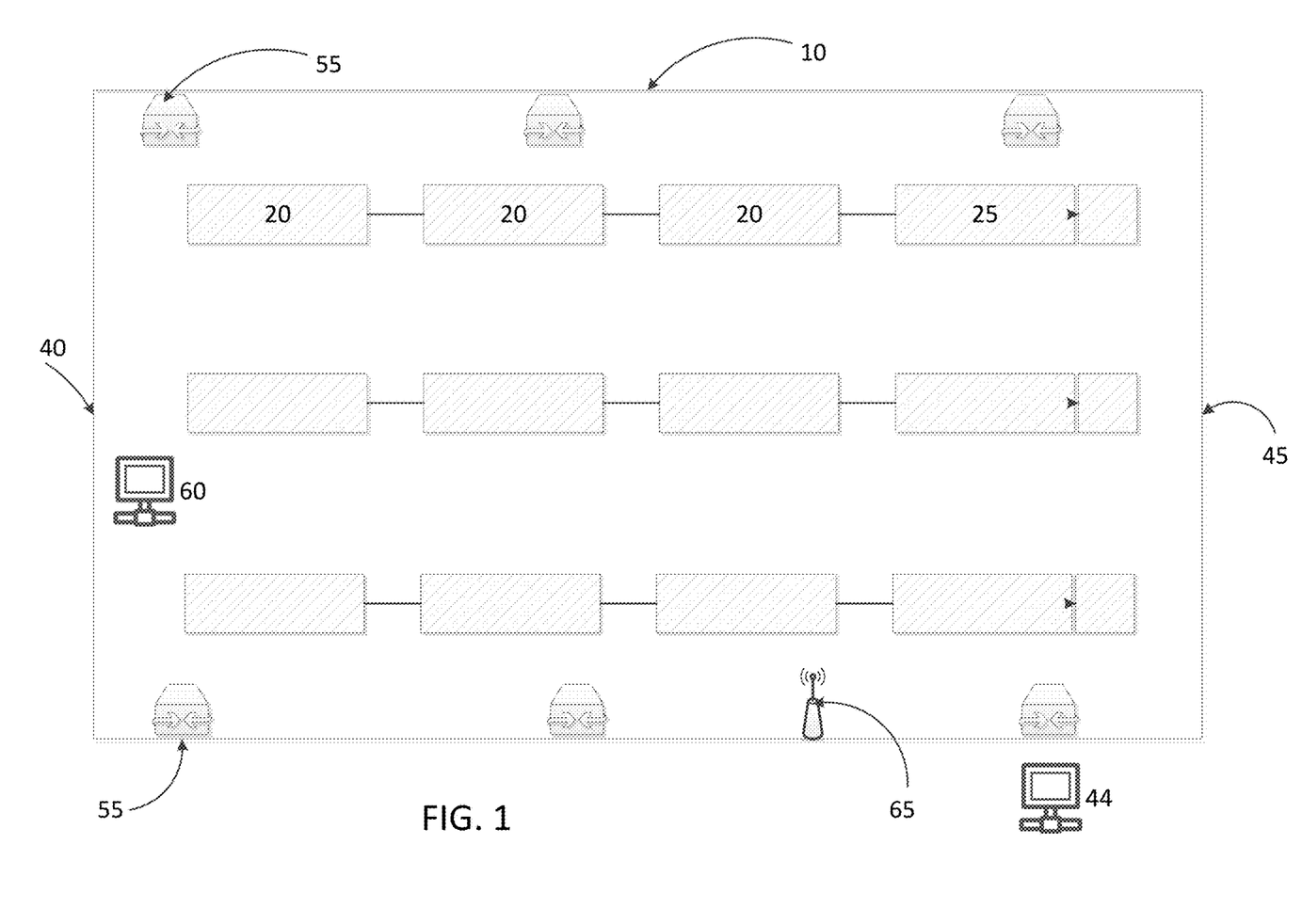
FIG. 1 shows a schematic view of a train yard in which embodiments of the invention are operating.

FIG. 1 shows a schematic view of a rail yard 10 having a number of train cars 20 at various locations within the yard 10. Groups of train cars may belong to the same train, denoted generally by driver of the Consist 25. The specific installation and arrangement of the tags 32 and 34 will be described further below. The rail yard 10 has an entrance 40 and an exit 45, although it is contemplated that in some arrangements, the entrance and the exit could be one and the same. A number of tracks (not shown) are present within the yard 10, one or more of which may extend out of the yard 10. Switches (not shown) may be provided to permit maneuvering between tracks as is known in the art. Gateways 55, location management system 60, and a communication network 65 are present in the preferred embodiment and may also provide for a real time locating system (RTLS). However, other means and systems for providing an RTLS are also contemplated. The teachings herein may be applied to other locations or sites other than train yards 10. In particular, the location or site may be any location where train cars need to be located, stored, modified or have maintenance operations performed thereon. In other embodiments, an RTLS is not present, and more simplified locating systems or systems for determining the relative location of train cars are used.

A plurality of train cars 20 are generally in a coupled relationship to form a Consist. Adjacent cars are adjoined by a coupling unit 48 (see FIG. 3), which includes both a mechanical coupling portion and an electrical coupling portion on a first train and a complimentary mechanical coupling portion and a complimentary electrical coupling portion on a second train adapted to couple to the coupling portions on the first train. The electrical coupling portion generally also includes control and/or communication signals which extend to all cars forming the Consist. Details of such coupling units, mechanical and electrical connections are well known in the art and are not described in further detail herein.

Train cars 20 may enter the yard 10 via the entrance and may then be parked designated parking spot. Various maintenance operations may then be performed on a train 25 or on individual train cars 20. In addition, different train cars 20 may be couple or uncoupled together to add cars, remove cars or otherwise rearrange cars on the train 25. Train cars 20 may typically be added or removed based on operating requirements, cargo/passenger load. By making use of the invention as herein described, the owner/operator of the train 25 may be made aware or otherwise track the state of each of the cars 20, even where the yard 10 where the modifications to the train 25 are being made is out of the jurisdiction or control of the owner/operator of the train 25. The state of each of the cars 20 may be determined via communications between an individual car 20, other cars, gateways 5555, and location management system 44. It is during these operations that the cars forming a Consist cannot accurately be determined in the prior art, particularly by an owner/operator of the train car where the train yard is run/operated by a different owner/operator.

Each of the cars 20 preferably comprises an RFID (radio frequency identification) asset tag 32 (referred to herein interchangeably as "tag 32", "asset tag 32" or Tag 32 may communicate via RFID (or similar communication that allows local communication, including in various frequency bands as required) with cars 20, gateways 55, and location management system 44. Other technologies or means of communication other than RFID tags are also contemplated.

Tags 32 may be located on or within each of the cars 20. Particular details of their location and connection are discussed further below. Tags 32 may operate in one or more "states" that govern their functioning. Tags 32 may transmit a beacon signal for a particular duration (transmission duration) every few seconds (or other transmission interval) and may listen for other signals for a particular duration (reception duration) every few seconds (reception interval). The location of asset tag 32 on the car 20 may be used to optimize communication ranges, reduce power consumption, and increase the ease of locating and sequencing. Each car 30 has at least one, and preferably two tags 32. With two tags 32, one is located at the front 22 of the car 20 and another at the rear 24 of the car 20. Optionally, the tags 32 may be able to retrieve and/or determine information relevant to the car 20 (status information), for example its location or information from other components (not shown) of car 20, site 12, or gateways 55, for example from one or more sensors, and transmit that information to other cars 20, gateways 55, or location management system 44 when they are within range, allowing the cars 20 to communicate with other components (for example providing status information to location management system 44) to provide additional functionality other than that described herein. Tags 32 and gateways 55 may comprise a processor, memory or storage, and other features typical of RFID tags and gateways, that may allow accomplishing of functionality described herein.

Asset tags 32 may further comprise a plurality of sensors (not shown), or be operably connected to sensors, that allow it to gather information regarding each car's status. Each of such sensors may be operably connected to tags 32.

Optionally, a plurality of reference tags 34 may be provided to communicate via RFID with other gateways 46 and tags 32. Reference tags 34 may be similar to asset tags 32 but may not change states. This may be accomplished, for example, by turning off an embedded motion sensor—not shown—which means states do not change. State changes may not be required by reference tags as reference tags 34 may be connected to a power source and thus conservation of battery power may not be important. To do so, reference tags 34 may initiate communication or tag 32 may initiate communication. Reference tags 34 may transmit an RFID communication signal that 'awakens' RFID tag 32 from a 'sleep' or 'wait' state (an "awaken signal"), for example if the transmission matches requirements of a particular RFID tag 32. RFID tag 32 may then transmit its information (such as sensor information as described herein), for example to gateway 46. Reference tags 34 may receive transmissions from one or more asset tags 32 via RFID communications and provide those transmissions to location management system 44 via communication network 26 (such as to perform operations, for example to monitor train cars 20). Reference tags 34 may be placed throughout the yard 10 so that they can communicate information with train cars 20.

Gateways 55 may be similar to reference tags 34 and further able to bridge the communication between any of reference tags 34 and tags 32 into other networks (such as communication network 42)—essentially acting as a gateway between two modes of communication that otherwise may not inter-communicate.

Central management system 44 may be a component of the system that provides functionality for users relating to one or more train cars 30. Such functionality may include tracking the location of cars 30, scheduling use, diagnosing any issues with cars 30 that may require servicing, and scheduling any service work that may be required. Central management system 44 may compile information from one or more gateways 55 or cars 30, via communication network 42 or RFID. Central management system 44 may be implemented via one or more pieces of software and may be operated by one or more users. Though it is shown as one computer, it can be composed of one or more computing and data storage devices and its functionality can be split up across these devices as appropriate. Of course location management system 44 may provide any other functionality as required to store, process and communicate data. Central management system 44 is shown as within train yard, but may be located anywhere, including remote from the train yard (though possibly still accessible from within the yard). Central management system 44 may comprise components as described herein. The central management system 44 will typically be in network communication with the owner/operator of the train cars and thus able to store information on which trains form a Consist as herein described, and subsequently or in real-time provide this information to the owner/operator of the train cars.

Components that communicate wirelessly, for example tag 32 and reference tag 34, have both a transmission range and a reception range. The transmission range denotes the distance which a component can transmit a signal to any other components within system, while the reception range of a component denotes the distance within which the component can hear signals. Components are said to be in communicable range of each other when the reception range of a first component overlaps with the transmission range of a second, or the transmission range of the first component overlaps with the reception range of the second. When this is not true, the components are said to be out of communicable range of each other. If the reception ranges of both components overlap with the other component's transmission range, the components are said to be in bi-directional communicable range. Generally, the further two components are from each other, the weaker the signals exchanged may be—allowing gateways 55 and tags 32 to estimate the distance from, and importance, of signals being received.

Communication network 42 may enable communication of information between various components of system including, but not limited to, reference tags 34 and location management system 44. Communication network 42 allows for a plurality of signals or information to be sent through its network simultaneously. Communication network 42 may be any public or private network, wired or wireless, and may be substantially comprised of one or more networks that may be able to communicate with each other. Communication network 42 may use a variety of mediums, such as cellular and WiFi networks. Communication networks 42 may not be required, for example, if components of system are able to communicate directly, such as via RFID communications.

Figure 2:
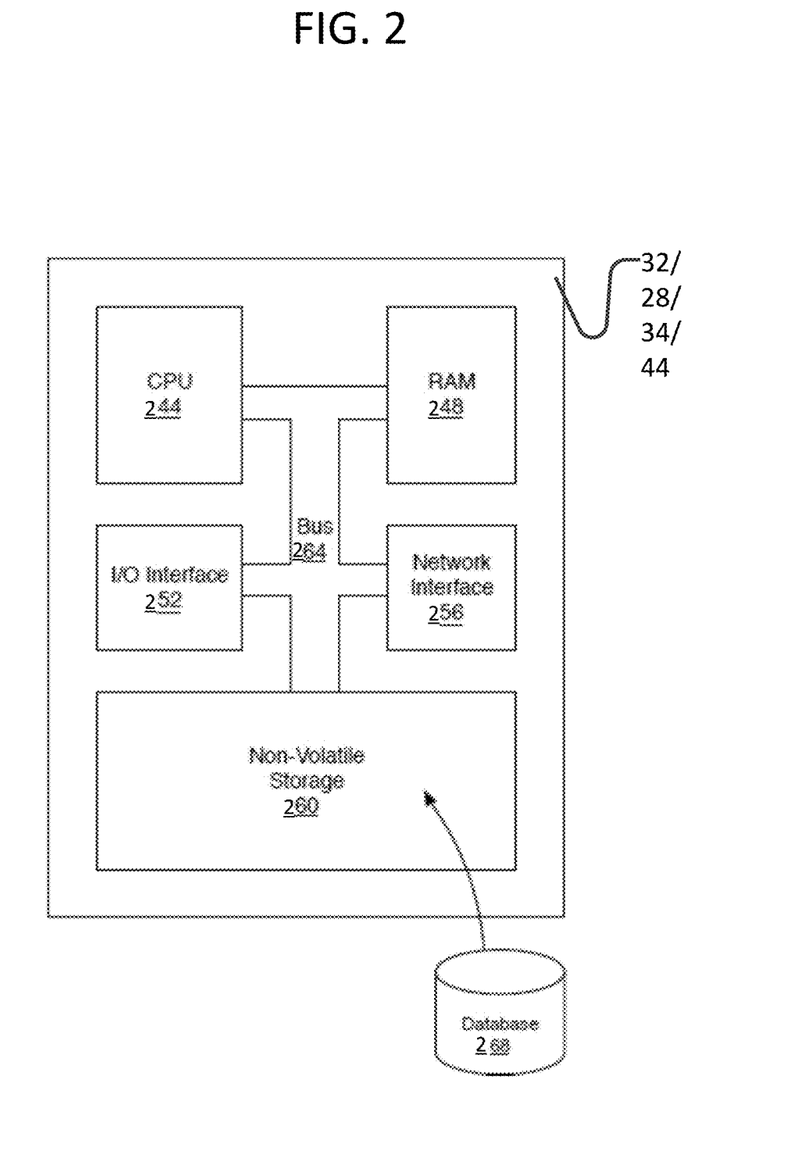
FIG. 2 shows a computer system used to implement elements of the invention.

FIG. 2 shows a number of components of central management system 44. As shown, central management system 44 has a number of components, including a central processing unit ("CPU") 244 (also referred to simply as a "processor"), random access memory ("RAM") 248, an input/output interface 252, a network interface 256, non-volatile storage 260, and a local bus 264 enabling the CPU 244 to communicate with the other components. CPU 244 executes an operating system and programs that provide the desired functionality. RAM 248 provides relatively-responsive volatile storage to CPU 244. The input/output interface 252 allows for input to be received or provided from one or more devices, such as a keyboard, a mouse, a touchscreen, etc., and enables CPU 244 to present output to a user via a monitor, a speaker, a screen, etc. Network interface 256 permits communication with other systems for receiving itinerary planning requests and for providing itinerary responses, in the form of web pages. Non-volatile storage 260 stores the operating system and programs, including computer-executable instructions for itinerary planning During operation the operating system, the programs and the data may be retrieved from the non-volatile storage 260 and placed in RAM 248 to facilitate execution.

Figure 3:
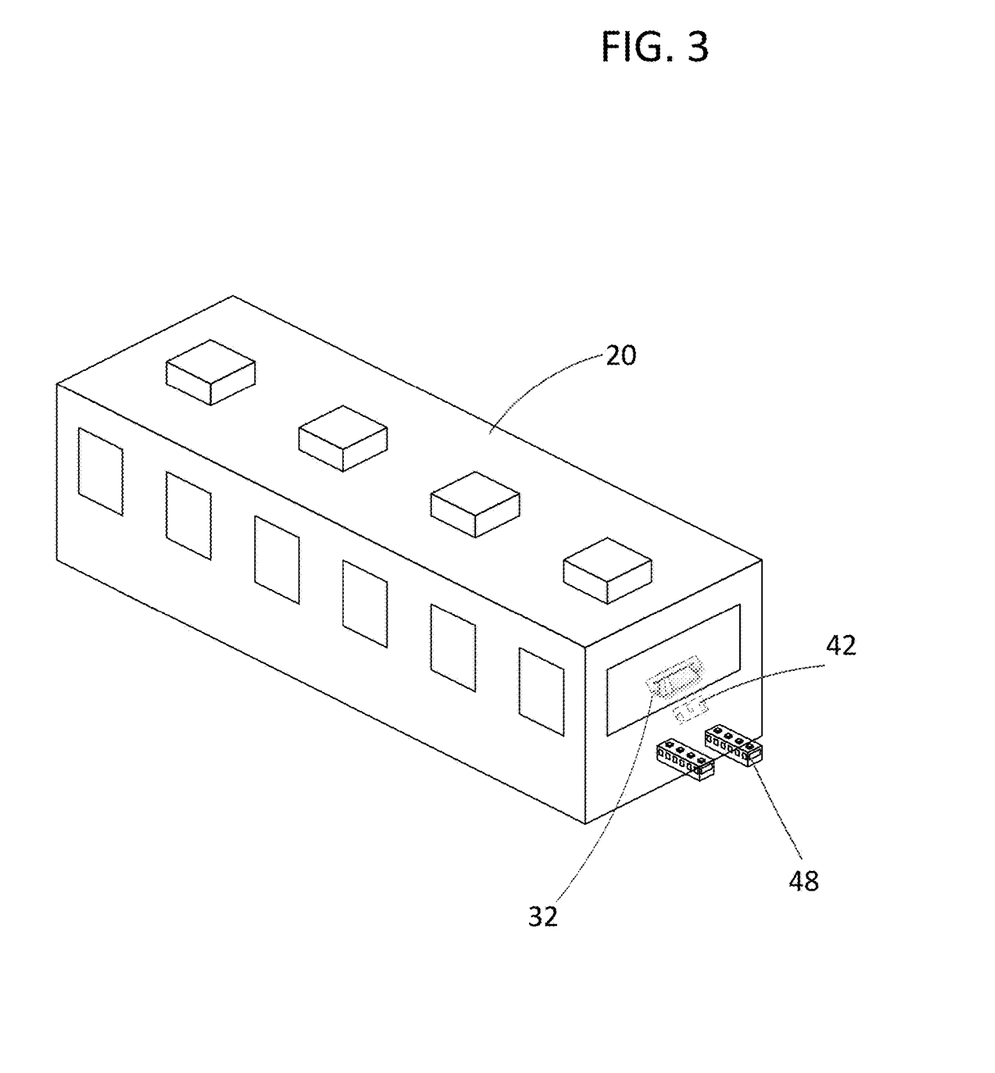
FIG. 3 shows a train car according to an embodiment of the invention.

Referring now to FIG. 3, each train car 20 will be provided with one, and preferably two, tags 32. Two tags 32 are preferred such that one tag can be placed at each end of the car. The tag 32 may be a conventional RFID tag capable of transmitting data as described above, or as is otherwise known in the art. The tag 32 is connected to a power filter module, which powers the tag, and a cable harness is provided to connect to a source of power aboard the train car 20.

Each tag 32 is provided with a digital input that is in signal communication with the dry contact on the train car 20. Generally, dry contacts form part of the electrical/signal connection between train cars to indicate whether two adjacent cars are coupled together. For example, on passenger rail cars, communications signals get passed from one car to the next to perform unitary functions, such as open/close doors, initiate announcements, etc. The connection between each of the cars typically also includes a dry contact, which serves merely to indicate whether a mechanical connection is present between adjacent cars or not. The dry contacts are in a closed state, and thus register a voltage when a mechanical connection is present and in an open state when there is no connection present. When a connection is present, the coupling of adjacent cars is indicated to be present. However, this indication is known within the signal line of the train only. Furthermore, the dry contacts only provide an indication that two cars are coupled together, without identifying those cars.

Each tag 32 is provided with a unique identifier whereby it can be associated with a known train car. Thus, each individual tag is associated with a particular train car, and this information can be stored in a database in the central management system 44, for example. Cross-referencing with this database by placing an enquiry with the central management system would readily identify the train car based on a tag associated with that car.

By placing a particular tag 32 into signal communication with the dry contact on a first train car, it becomes possible to (a) determine whether the first train car is coupled to a second train car by virtue of the digital signal output from the dry contact on the first train car; and (b) determining the identity of the second train car by virtue of determining the train car in closest geographic proximity to the first train car which also provides an indication of being coupled. Optionally, a confirmatory check can be accomplished by repeating the determination with respect to the second train car. These two cars may now be said to be part of a Consist, as earlier defined. Additional train cars determined to be coupled to either the first or second train car would also form part of the Consist.

Figure 4:
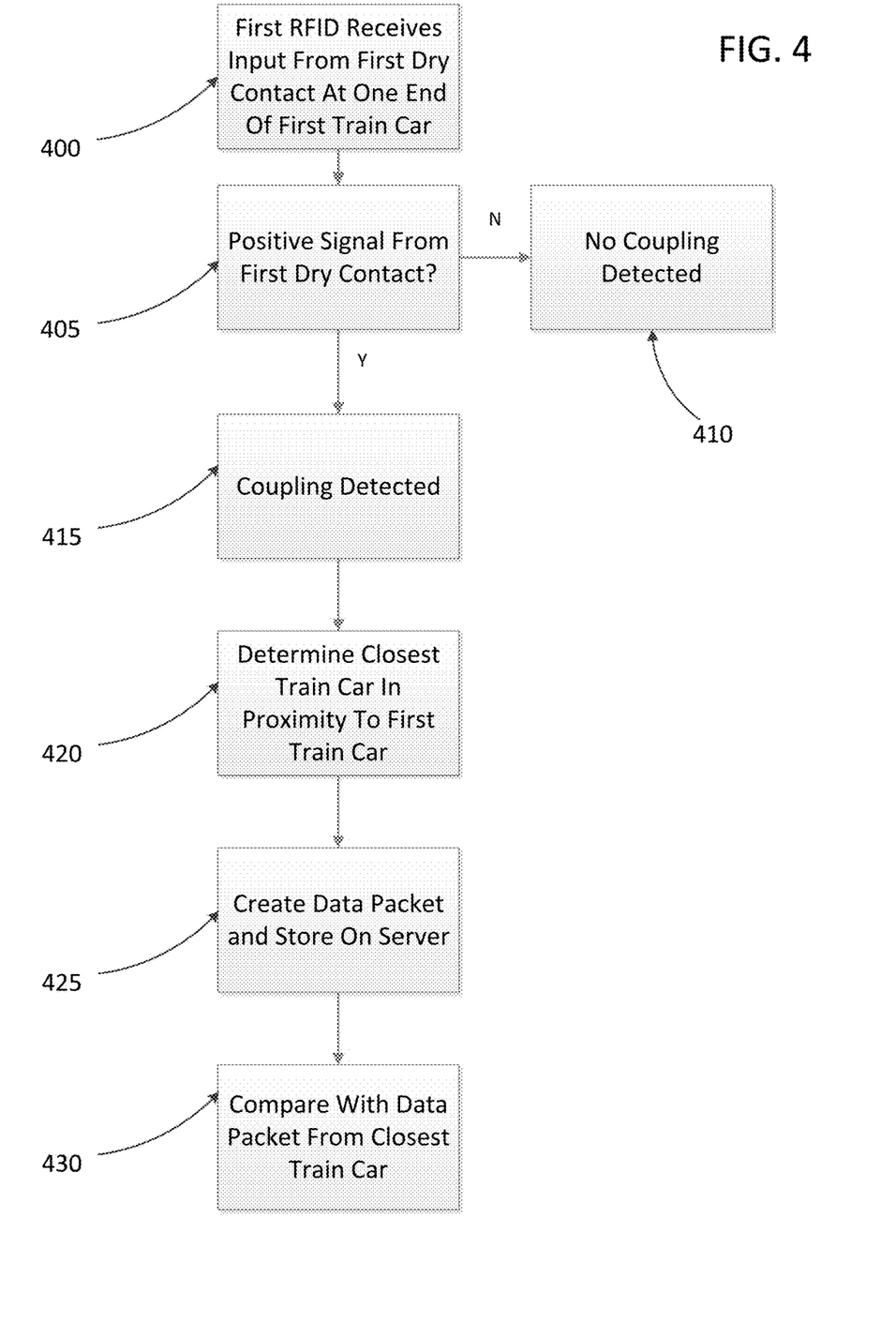
FIG. 4 illustrates a method according to one embodiment of the invention.

FIG. 4 illustrates one embodiment of the invention by which the cars forming a Consist can be determined. In step 400, a first RFID mounted in signal communication with a first dry contact aboard a first train car receives a signal from the first dry contact. The RFID could be either at the front or rear ends of the train car, and in signal communication with a correspondingly positioned dry contact. At step 405, a determination is made whether the first RFID detects a positive signal from the first dry contact. A positive signal may be a positive voltage or any voltage above a known value indicative of the dry contact being closed. If a positive signal is not detected, then at step 410, it has been determined that the first train car is not coupled to a second train car at an end of the train at which the first RFID and first dry couple are mounted. If the first RFID detects a positive signal then at step 415, it has been determined that the first train car is coupled to a second train car. In other embodiments, the RFID device may be any other communications device used to communicate with the train car or otherwise used in the RTLS, where applicable.

At this point, the identity of the second train car is not known. All that is known is that the first train car is actively coupled to another train car and these two form the Consist. Accordingly, the next step in the method is to determine the identity of the second train car. The invention contemplates accomplishing this at step 420, where a determination is made as to the closest train car to the first train car. The closest train car to the first train car can be determined by comparing the signal strength of all other RFID tags within the train yard as received by the first RFID tag at the first train car. The train car in closest proximity would be that whose RFID tag is emitting a signal detected to be the strongest signal from the first RFID tag. The first RFID tag compares the strength of all signals received, and the strongest one is determined to be that from a car in closest proximity to the first train car.

Finally, at step 425, a data packet is created and sent to a server or database, for example that in communication with the central management system. This data packet contains information identifying the first train car, an indicator of its coupled status and the determined next closes train. Optionally, this data packet from the first train car can then be compared with the data packet from the second train car to confirm the coupling status. That is, when applying the method to the second train car, if it is determined to be coupled and the closest train car is determined to be the first train car, there is a confirmation of the coupling status of the first and second train cars.

The above example has been provided for illustrative purposes. In practice, it is preferred that the method is carried out for both the front and back ends of the train car to determine whether there is a coupled train car attached to each of the front and back ends of the train.

The tag 32, and associated hardware used to couple the tag 32 to the dry contact aboard a train car, are generally off-the-shelf components. For example, a power filter module could be provided to permit the tag 32 to accept the operating voltage aboard the train car. Such filters are known in the art. In addition, a cable harness could be provided to connect the power module and the tag 32.

In an exemplary implementation, the tag 32 is adapted to receive a connector, having the following pin allocations:

Pin 1—Battery only power. For example, not exceeding 3.6V DC.
Pin 2—Input 1 used for determination of consist coupling status.
Pin 3—Input 2, which may or may not be active.
Pin 4—Ground
Pin 5—Ground
Pin 6—Regulated voltage input up to 25 Vdc
Pin 7—programming pin.
Pin 8—programming pin.

The power filter module 52 has two connector blocks allocated so that one block (P1) is connected to the train car while the other (P2) is used to connect to the tag. The pin allocations on the power filter module 52 may be as follows:

P1-1: Ground—this will connect to the power side ground on the car.
P1-2: 3.3Vout—this is a low voltage, low current output that will connect to the dry contact for sensing the coupling status of the car.
P1-3: TRG1—this is the coupling status return path that will become an input for the RFID tag.
P1-4: Vin—this will be the voltage input from the car and can be in the range of 12-40 Vdc.
P2-1: Vbatt—when the power module is supplied with internal batteries, this pin will be connected to the tag.
P2-2: Vfilter—this input provides regulated, filtered power to the tag at 12 Vdc
P2-3: TRG2—Future Use
P2-4: IN1—this pin serves as the input to the tag for the consist detection
P2-5: IN2—Future Use
P2-6: GND—this will be the ground connection to the tag.

In the above-described examples, the power filter module 52 contains a thru-signal from the dry contact leading into the tag 32. However, in embodiments where the power filter module is not necessary or where the tag itself has a built-in filter module (not illustrated), then the dry contact could be directly connected to the tag itself. The tag 32 is preferably installed on a window or other end portion of the train car so as to facilitate transmission of the radio frequency signal.

Accordingly, one skilled in the art will appreciate that the invention permits the central management system as herein described (or any other computer system in communication with either the central management system or in communication with the communication network at the train yard) to store the coupling status of either end of each train car and the identity of the trains cars coupled together to form the Consist.

Train cars 20 may be other types of vehicles or transport units which are typically coupled together to form a larger moveable entity. Examples include, but are not limited to, subway cars, light rail vehicles, rail-implemented cargo vehicles, road-based vehicles being towed or hitched, and other vehicles where separate vehicles are coupled together and decoupled from each other at various points during use.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:
1. A system for identifying transport units in coupled relationship comprising
a plurality of transport units in a predefined area;
a first transport unit among said plurality of transport units having one end of a coupling unit at a front end thereof; said one end of said coupling unit including a first mechanical coupling portion and a first electrical coupling portion;
a second transport unit among said plurality of transport units have a second end of said coupling unit at a rear end thereof; said second end of said coupling unit including a second mechanical coupling portion and a second electrical coupling portion;
at least one additional transport unit among said plurality of transport units being closest in physical proximity to said first transport unit;
said first electrical coupling portion including a first dry contact having a closed state when said first mechanical coupling portion and said second mechanical coupling portion are coupled together and an open state when said first mechanical coupling portion and said second mechanical coupling portion are uncoupled from each other;
said second electrical coupling portion including a second dry contact having a closed state when said second mechanical coupling portion and said first mechanical coupling portion are coupled together and an open state when said first mechanical coupling portion and said second mechanical coupling portion are uncoupled from each other;
a communications device on said first transport unit in signal communication with said dry contact; said communications device configured to communicate a data packet identifying said first transport and a state of said dry contact to a communications receiving device;
a communications device on said second transport unit in signal communication with said second dry contact; said communications device configured to communicate a data packet identifying said second transport and a state of said second dry contact to a communications receiving device;
a communications device on said at least one additional transport unit configured to communicate a data packet identifying said additional transport unit to a communications receiver;
said communications receiving device including a computer processor and computer executable instructions for determining a transport unit amongst said plurality of transport units in closest coupled proximity to said first transport unit and for providing an indication that said first transport unit is coupled to said second transport unit upon a condition in which said first dry contact is in said closed state and upon a condition in which said transport unit amongst said plurality of transport units in closest coupled proximity to said first transport unit is determined to be said second transport unit;
said communications receiving device further including computer executable instructions for confirming the identity of said first transport unit and said second transport unit indicated to be coupled by determining a transport unit amongst said plurality of transport units in closest coupled proximity to said second transport unit and for providing an indication that said second transport unit is coupled to said first transport unit upon a condition in which said second dry contact is in said closed state and upon a condition in which said trans- port unit amongst said plurality of transport units in closest coupled proximity to said second transport unit is determined to be said first transport unit, whereby confirmation is provided that said first transport unit is coupled to said second transport unit and avoiding an indication where said transport unit amongst said plurality of transport units in closest physical proximity is said at least one additional transport unit incorrectly indicated to be coupled to said first or said second transport units.

2. The system according to claim 1, wherein said second transport unit further comprises
a second dry contact having a closed state when said first mechanical coupling portion and said second mechanical coupling portion are coupled together and an open state when said first mechanical coupling portion and said second mechanical coupling portion are uncoupled from each other;
a second communications device in signal communication with said second dry contact; said second communications device configured to communicate a data packet identifying said second transport and a state of said second dry contact to said communications receiving device.

3. The system according to claim 2, wherein said communications receiving device including computer executable instructions for determining a transport unit in closest proximity to said second transport unit and for providing an indication that said second transport unit is coupled to said first unit upon a condition in which said dry contact is in said closed state.

4. The systems according to claim 3, wherein said communications receiving device validates that said first transport unit is coupled to said second transport unit by comparing said data packet identifying said first transport unit and said data packet identifying said second transport unit.

5. The system according to claim 1, wherein said first and second transport units are rail cars.

6. The system according to claim 1, wherein said communications device comprises an RFID tag.

7. The system according to claim 6, wherein said communications receiving device comprises a server receiving data directly or indirectly from said communications device.

8. The system according to claim 6, wherein said RFID tag is coupled to said transport unit via a power filter module.

* * * * *